United States Patent [19]

Van Order

[11] Patent Number: 4,818,013
[45] Date of Patent: Apr. 4, 1989

[54] VISOR MOUNTING ASSEMBLY
[75] Inventor: Kim L. Van Order, Hamilton, Mich.
[73] Assignee: Prince Corporation, Holland, Mich.
[21] Appl. No.: 78,381
[22] Filed: Jul. 27, 1987
[51] Int. Cl.$^4$ .............................................. B60J 3/02
[52] U.S. Cl. ................................. 296/97.13; 296/971.1
[58] Field of Search ........................ 296/97 K, 97 H; 248/289.1; 403/329

[56] References Cited

U.S. PATENT DOCUMENTS

| | | | |
|---|---|---|---|
| 2,110,120 | 3/1938 | Ball | 296/97 K |
| 2,357,974 | 9/1944 | Roberts | 248/289.1 |
| 2,917,186 | 12/1959 | Beets | 296/97 K |
| 2,939,741 | 6/1960 | Keating et al. | 296/97 K |
| 3,150,896 | 9/1964 | Plattner | 296/97 K |
| 3,399,923 | 9/1968 | Bornefeld et al. | 296/97 H |
| 3,477,678 | 11/1969 | Icke et al. | 296/97 K |
| 3,767,256 | 10/1973 | Sarkees | 296/97 K |
| 3,999,871 | 12/1976 | Palmer et al. | 296/97 K |
| 4,148,519 | 4/1979 | Hollar, Jr. | |
| 4,178,035 | 12/1979 | Cziptschirsch | 296/97 K |
| 4,352,518 | 10/1982 | Prince et al. | 296/97 H |
| 4,363,511 | 12/1982 | Viertel et al. | 296/97 K |
| 4,377,020 | 3/1983 | Vigo | 296/97 K |
| 4,390,202 | 6/1983 | Flowerday et al. | 296/97 K |
| 4,489,974 | 12/1984 | Warhol | 296/97 K |
| 4,529,157 | 7/1985 | Suman et al. | 248/289.1 |
| 4,553,797 | 11/1985 | Marcus | 296/97 H |
| 4,569,552 | 2/1986 | Marks | 296/97 K |
| 4,634,196 | 1/1987 | Nestell | 403/329 |

FOREIGN PATENT DOCUMENTS

| | | |
|---|---|---|
| 1965143 | 7/1970 | Fed. Rep. of Germany . |
| 2234921 | 1/1974 | Fed. Rep. of Germany . |
| 7415154 | 8/1974 | Fed. Rep. of Germany . |
| 2341940 | 3/1975 | Fed. Rep. of Germany . |
| 7531982 | 2/1976 | Fed. Rep. of Germany . |
| 1251479 | 10/1971 | United Kingdom . |
| 2034397 | 6/1980 | United Kingdom . |

Primary Examiner—Robert R. Song
Attorney, Agent, or Firm—Price, Heneveld, Cooper, DeWitt & Litton

[57] ABSTRACT

A visor pivot rod for mounting a visor to a vehicle includes a threaded fitting one end which is adapted to thread into a mounting bracket of a dissimilar material having a central bore threaded to compressibly receive the threaded end of the visor rod and hold the visor rod in an axially adjusted position with a predetermined torque to prevent sticking of the two elements. The mounted bracket in turn is adapted to be secured to the roof of a vehicle in one embodiment or be integral with the visor core or mounted within the visor core in another embodiment. In the preferred embodiment of the invention, the threaded end of the visor rod includes a polymeric molded-on fitting having a threaded end which engages a threaded bracket also made of a molded polymeric material.

24 Claims, 2 Drawing Sheets

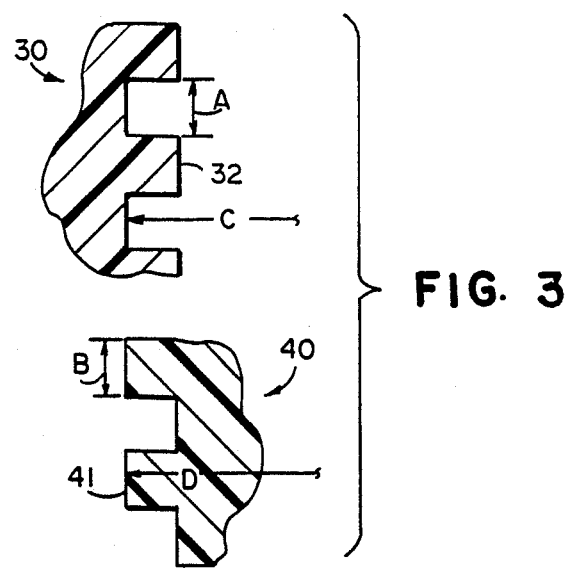
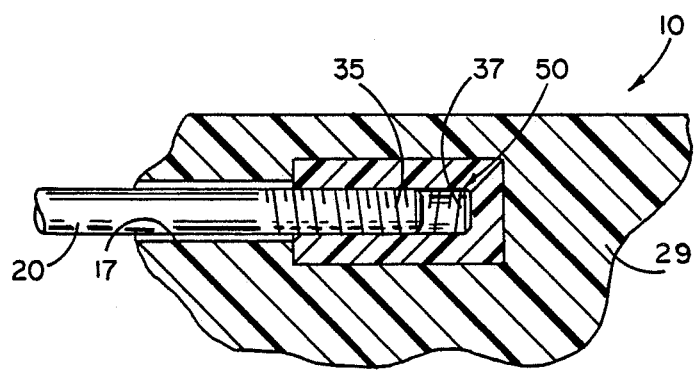

VISOR MOUNTING ASSEMBLY

BACKGROUND OF THE INVENTION

The present invention pertains to a torque fitting for mounting a pivot rod to a visor or to the vehicle roof.

Visors used in vehicles are pivoted on a support rod for movement between a raised storage position and a lowered use position for blocking sunlight from the driver's eyes. Typically, the visors can also be pivoted from the front or windshield position to the side window to cover either the windshield or one of the side windows during use. In order to hold the visor in a raised stored position or a lowered use position adjusted to one side, the visors typically include a pair of torque fittings holding the visor to the visor pivot rod for controlling the movement and position of the visor in a vertical direction as well as one for coupling the visor pivot rod to the vehicle roof for holding the visor in a front or side window position. A variety of pivot mounts have been suggested for mounting the visor rod which extends from the body of the visor to the visor and also to the vehicle roof. Such structure includes, for example, those disclosed in U.S. Pat. Nos. 4,352,518; 4,390,202; 4,500,131; 4,529,157; 4,553,797; 4,569,552 and 4,634,196 all assigned to the present assignee. Although these mounting brackets all provide the desired mounting of a visor rod to the visor and vehicle, in some cases they involve relatively complex multiple piece structures to achieve their desired objectives.

SUMMARY OF THE PRESENT INVENTION

The visor mounting system of the present invention provides a mounting system for attaching the visor rod to the visor or roof of a vehicle and one which is relatively uncomplicated in its construction to provide such a mounting system.

The apparatus embodying the present invention includes a visor pivot rod adapted to extend from one end of the visor and including thereon a threaded end which is adapted to thread into a mounting bracket of a dissimilar material having a central bore threaded to compressibly receive the threaded end of the visor rod and hold the visor rod in an axially adjusted position. The use of dissimilar materials includes one which displays sufficient lubricity to prevent sticking of the two elements. The mounting bracket in turn is adapted to be secured to the roof of a vehicle in one embodiment or be integral with the visor core or mounted within the visor core in another embodiment.

In the preferred embodiment of the invention, the projecting end of the visor rod includes a polymeric molded-on fitting having a threaded end which engages a threaded bracket also made of a molded polymeric material. In one embodiment of the invention the threads employed were square threads which were dimensioned to provide sufficient friction between the fixed mounting bracket and pivoted rod end to allow selective pivoting of the visor from the front window to the side window while holding the visor in a selected adjusted position.

These and other features, objects and advantages of the present invention will become apparent during the following description thereof together with references to the accompanying drawings in which:

BRIEF DESCRIPTION OF THE DRAWINGS

FIG. 3 is an enlarged fragmentary cross-sectional view of the threads of each of the two members shown in FIG. 2; and FIG. 4 is a schematic diagram showing the use of the invention to mount the visor rod to the visor body.

DETAILED DESCRIPTION OF THE PREFERRED EMBODIMENT

Figure 1:
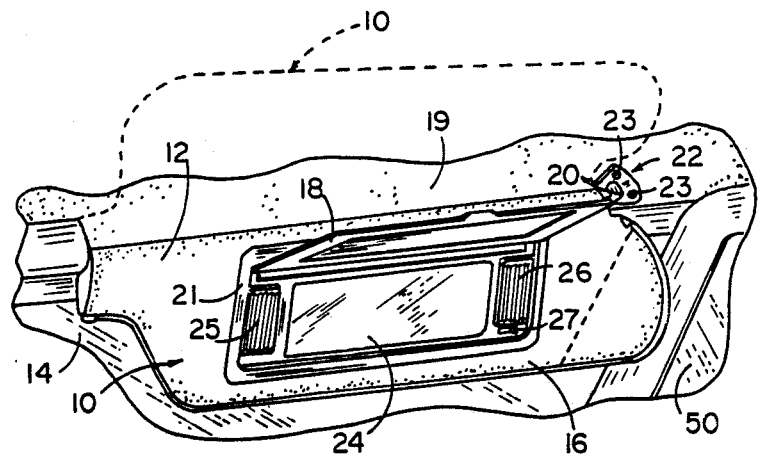
FIG. 1 is a fragmentary perspective view of a visor installation embodying the system of the present invention.

Referring initially to FIG. 1, there is shown a visor assembly 10 which is mounted to the roof 19 of a vehicle on the passenger side and adjacent the top edge of the vehicle windshield 14. The top edge 12 of the visor includes a core 29 with a channel 17 (FIG. 4) for receiving a visor pivot rod 20 which allows the visor body 16 to pivot between a raised stored position against the headliner or roof 19 of the vehicle (shown in phantom form in FIG. 1) to a lowered use position as illustrated in FIG. 1. The visor also includes an illuminated vanity mirror package including a mirror 24 spanned on either side by lamp means 25 and 26 mounted within a frame 21 and selectively enclosed by a cover 18. The visor is shown with the cover in an opened use position to permit a passenger to utilize the illuminated vanity mirror 24 which can provide selective light intensity by the actuation of a dim/bright switch 27. The illuminated vanity mirror package can generally be of the type disclosed in U.S. Pat. No. 4,227,451.

The visor pivot rod 20 is mounted within the visor body using either the torque fitting incorporating the present invention as schematically shown in FIG. 4 described below or one such as disclosed in U.S. Pat. No. 4,500,131, the disclosure of which is incorporated herein by reference. The extending end 21 of the visor rod 20 is mounted to the roof 19 of the vehicle by a mounting assembly including torque fittings embodying the present invention which is now described in detail in connection with FIGS. 2 and 3.

The visor mounting system 22 of the present invention includes a visor mounting bracket 30 and a threaded member 40 which in the preferred embodiment is integrally molded to end 21 of the visor pivot rod 20. The mounting bracket 30 includes a central bore 32 having a square thread 31 formed therein and extending through the central collar 34 which terminates in an integral mounting flange 36. Flange 36 includes a recessed aperture 38 communicating with bore 32 for recessing the threaded end 41 of member 40 such that, upon installation, no threads are visible. Flange 36 of bracket 30 also includes a plurality of spaced apertures 37 for receiving mounting screws 23 as shown in FIG. 1 for securing the bracket to the roof of the vehicle.

The threaded end 40 of rod 21 is, in the preferred embodiment, a separate fitting 40 molded on to the rod 21 and includes a square thread 41 which mates with thread 31 of mounting bracket 30. The fitting 40 is integrally molded over the end 21 of rod 20 with a suitable and conventional locking channel to prevent its rotation with respect to rod end 21 and includes an integral 90° elbow section 42.

In the preferred embodiment of the invention, the mounting bracket was made of a suitable polymeric material such as an acetal copolymer and in the preferred embodiment, CELCON M-90, made by the Celanesse Corporation, was employed. The square thread utilized was approximately ½×13 having a major diameter of 12.7 mm and a minor diameter of 10.75 mm. The length of the thread was approximately 15 mm. The elbow assembly 40, on the other hand, was also molded of a suitable but dissimilar polymeric material such as an engineering thermoplastic material. In the preferred embodiment, the thermoplastic material is a thermoplastic polyester such as VALOX 311, manufactured by the General Electric Company. Thread 41 of fitting 40 also was a ½×13 square thread having a pitch of 1.954 mm, a major diameter of 12.455 mm and a minor diameter of 10.977 mm. By utilization of a square thread, a maximum surface area of contact is provided which together with the materials selected provides a lubricious but friction or interference fit of the visor rod end 41 within mounting bracket 30 to provide the desired rotational torque. During assembly, the mounting bracket 30 is first positioned on and spun over the end 41 of elbow 40 and subsequently, the visor is installed in the vehicle by fasteners 23 attaching bracket 30 to the roof of the vehicle.

An important aspect of the present invention is the control which can be achieved by utilization of a square thread, dissimilar materials, and/or dimensional changes to provide a compression fitting between the end 41 of the rod and the threaded socket 32. This can be achieved as shown in FIG. 3 by providing a dimension A for thread 32 which is slightly less than the dimension of the corresponding mating thread section of the rod end 41 to provide a slight compression in an axial direction for the threads to provide a controlled torque. In the preferred embodiment, dimension A was approximately 5% less than dimension B. Similarly, the diameters of the respective female and male thread sections can be slightly different such that, for example, the diameter C of thread 32 is slightly less (about 5%) than the diameter D of thread 41 to provide sufficient friction to hold the visor rod end in a selected adjusted position within the mounting bracket 30.

A torque fitting such as a bracket 30 and threaded end member 40 can likewise be incorporated for the interconnection between the visor rod itself and the body of the visor as illustrated in FIG. 4. In this embodiment, the visor rod 20 extends through the channel 17 formed in a polymeric visor core 29 made of a material such as polypropylene. The end 35 of visor rod 20 is directly threaded with a square cut thread, and core 29 is either correspondingly threaded or a suitable insert member 50 is anchored in the core 29 and similarly threaded at 37 to provide the desired frictional torque between rod end 35 and core 29 to permit the visor to be raised and lowered between stored and use positions and selectively held in either of the positions.

Figure 2:
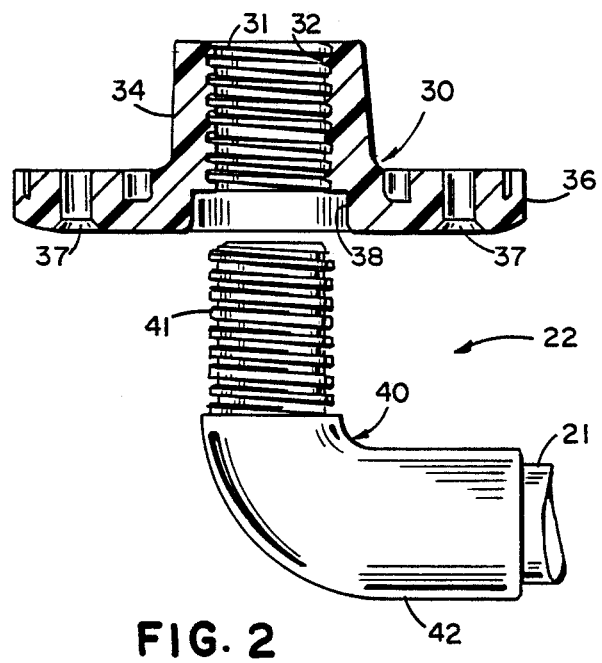
FIG. 2 is a greatly enlarged partially cross-sectional and fragmentary view of the visor mounting system of the present invention.

The thread dimensions and the dissimilar material employed can be varied somewhat so long as the resultant frictional torque is sufficient to hold the visor in position. Naturally, the torque required depends on the visor weight determined by its construction and whether or not it includes an illuminated vanity mirror assembly as illustrated in FIG. 1 or is simply a blank visor with no mirror assembly. In the preferred embodiment shown in FIG. 2, the torque required to move the visor from the front window position to the side window position was from 9 to 25 inch-pounds. In the embodiment illustrated in FIG. 4 connecting the visor rod to the visor body itself, the torque required to move the visor 10 from a raised stored position to a lowered use position was from 2 to 18 inch-pounds. The torque is selected, in part, by the utilization of square threads in the preferred embodiment, and in part by the utilization of dissimilar materials in which both materials can be polymeric as illustrated in the embodiment of FIG. 2 or as shown in FIG. 4, the steel rod 20 can be threaded into a polymeric fitting 50 of CELCON M-90 or into the polymeric visor core 29. Further, the desired torque is also achieved by the utilization of slightly dissimilar thread sizes to provide a compressive force which together with the coefficient of friction between the parts provides the desired torque. It is desirable, however, to use at least one polymeric material which presents a lubricious surface between the two relatively moved members for preventing sticking of the visor in an adjusted position and yet provide sufficient force for holding it in the selected position.

As can be seen with the system of the present invention, the visor rod mounting assembly is cost effective requiring only two threaded elements 30 and 40 and provides a rotational interfitting of the visor rod to the visor and/or vehicle permitting the desired torque for adjustment of the visor. It will become apparent to those skilled in the art that the various modifications to the preferred embodiment, as described herein, can be made without departing from the spirit or scope of the invention as defined by the appended claims.

The embodiments of the invention in which an exclusive property or privilege is claimed are defined as follows:

1. A torque fitting assembly for use with a sun visor pivot rod for a vehicle a comprising;
    a threaded fitting having an opening at one end for lockably receiving an end of visor pivot rod and having threads formed at an opposite end; and
    a threaded bracket having a bore for threadably receiving said threads on said threaded fitting and including means for securing said bracket to a vehicle roof, and wherein said fitting and said bracket have threads shaped to provide a predetermined torque for relative movement between them.

2. The apparatus as defined in claim 1 wherein said fitting and said bracket are made of dissimilar materials.

3. The apparatus as defined in claim 2 wherein at least one of said fitting or bracket is made of a lubricious polymeric material.

4. The apparatus as defined in claim 3 wherein said threads are formed as square threads.

5. The apparatus as defined in claim 4 wherein dimensions of said threads are selected to provide an interference fit between said fitting and bracket.

6. The apparatus as defined in claim 5 wherein the end of the visor pivot rod is threaded and said bracket is threadably coupled to said threaded end of the visor pivot rod.

7. A visor pivot rod and torque fitting assembly for mounting a sun visor to a vehicle comprising:
    a visor pivot rod;
    a first member integrally molded to one end of said pivot rod and having threads formed at an end extending from said pivot rod; and
    a second member having threads at one end to threadably couple to said threads on said first member and an opposite end including means for securing said second member to a vehicle roof and wherein said first and second members have threads shaped to provide a predetermined torque for relative movement between said members.

8. The apparatus as defined in claim 7 wherein said first and said second members are made of dissimilar materials.

9. The apparatus as defined in claim 8 wherein at least one of said members is made of lubricious polymeric material.

10. The apparatus as defined in claim 9 wherein said threads are formed as square threads.

11. The apparatus as defined in claim 10 wherein said first member is a 90° elbow.

12. The apparatus as defined in claim 7 wherein the opposite end of said visor rod is threaded and further including a third threaded member adapted to be mounted within the visor for threadably receiving said opposite end of said rod for controlling the raising and lowering torque of the visor between stored and use positions.

13. A sun visor mounting system for a vehicle comprising:
 a visor pivot rod for attaching a visor to a vehicle for movement between a raised stored position and a lowered use position, said rod including thread means on at least one end thereof;
 a visor body including channel means for receiving said visor rod; and
 a first threaded member threadably coupled to said thread means on said rod, said threaded member positioned within said channel means of said visor body to provide a predetermined rotational torque between said rod and said threaded member at threaded connection between them.

14. The apparatus as defined in claim 13 wherein said thread means and said first threaded membrane made of dissimilar materials.

15. The apparatus as defined in claim 14 wherein at least one of said materials is a lubricious polymeric material.

16. The apparatus as defined in claim 15 wherein said threads are formed as square threads.

17. The apparatus as defined in claim 16 wherein the other end of said visor pivot rod includes second thread means and further including a second threaded member threadably coupled to said second thread means and to the other of said vehicle roof.

18. The apparatus as defined in claim 13 wherein said thread means are formed directly in said pivot rod.

19. The apparatus as defined in claim 13 wherein said thread means comprises a threaded fitting integrally molded onto said pivot rod.

20. The apparatus as defined in claim 19 wherein said thread means and said first threaded member are made of dissimilar polymeric materials.

21. A visor rod and connection for controlling the visor movement in a vehicle comprising:
 a visor body including a threaded fitting mounted within said visor body near the upper edge of said visor body, and
 a visor pivot rod for mounting said visor body to a vehicle for pivoting movement between a raised stored position and a lowered use position, said pivot rod including a first end which is threaded and which threadably couples to said threaded fitting of said visor body and cooperates therewith to provide a predetermined rotational torque for holding said visor body in an adjusted position and allowing said visor body to be moved between said raised and lowered positions, said visor pivot rod including a second end extending from said visor body for coupling to the vehicle.

22. The apparatus as defined in claim 21 wherein said pivot rod and said threaded fitting are made of dissimilar materials.

23. The apparatus as defined in claim 22 wherein at least one of said pivot rod or threaded fitting is made of a lubricious polymeric material.

24. The apparatus as defined in claim 23 wherein said threads are square threads.

* * * * *

UNITED STATES PATENT AND TRADEMARK OFFICE
CERTIFICATE OF CORRECTION

PATENT NO.  : 4,818,013

DATED       : 4/4/89

INVENTOR(S) : Kim Van Order

It is certified that error appears in the above-identified patent and that said Letters Patent is hereby corrected as shown below:

On the title page,
Abstract, Line 8:
    "mounted" should be --mounting--

Column 3, Lines 4 and 5:
    "Celanesse" should be --Celanese--

Column 4, Claim 1, Line 36:
    after "vehicle" delete --a--

Column 5, Claim 13, Line 34:
    after "at" insert --the--

Column 5, Claim 14, Line 37:
    "membrane" should be --member--

Signed and Sealed this

Fifteenth Day of May, 1990

Attest:

HARRY F. MANBECK, JR.

*Attesting Officer*   *Commissioner of Patents and Trademarks*